United States Patent [19]

Saunders

[11] Patent Number: 4,948,195
[45] Date of Patent: Aug. 14, 1990

[54] GAP CLOSER FOR AUTOMOBILE SEATS

[76] Inventor: William W. Saunders, 2537 Navarra Dr., Carlsbad, Calif. 92089

[21] Appl. No.: 392,593

[22] Filed: Aug. 11, 1989

[51] Int. Cl.⁵ ............................................. A47D 15/00
[52] U.S. Cl. ....................................... 297/182; 108/44
[58] Field of Search ................. 297/182; 108/51.3, 67, 108/102, 27, 44; 224/275, 42.11; 5/283, 503, 508

[56] References Cited

U.S. PATENT DOCUMENTS

| 2,571,574 | 10/1951 | Hicks | 297/182 |
| 2,790,184 | 4/1957 | Testa | 224/275 X |
| 2,836,229 | 5/1958 | Spetner | 297/182 |
| 3,063,064 | 11/1962 | Mace | 108/44 X |
| 3,428,357 | 2/1969 | Leuck | 224/275 X |
| 4,234,978 | 11/1980 | Snow | 5/419 X |
| 4,554,039 | 11/1985 | James | 5/508 X |
| 4,756,459 | 7/1988 | Hardman | 224/275 |

FOREIGN PATENT DOCUMENTS 2342323 3/1975 Fed. Rep. of Germany ...... 297/182

Primary Examiner—Jose V. Chen
Attorney, Agent, or Firm—Lewis E. Massie

[57] ABSTRACT

A vertical cardboard wedge of adjustable length and thickness with an accordion pleated horizontal top for closing the gap between the front seats and console of an automobile for preventing objects from dropping into the gap.

1 Claim, 1 Drawing Sheet

GAP CLOSER FOR AUTOMOBILE SEATS

BACKGROUND OF THE INVENTION

1. Field of the Invention

Cardboard, or similar structure adapted to be wedged within the gap between the front seats and console in an automobile for preventing objects from dropping into the gap and becoming difficult to retrieve

2. Description of the Related Art

There is very little prior art on this concept Only one subclass contained any pertinent patents. The most pertinent patent is U.S. Pat. No. 2,571,574 Hicks, 1951 which discloses an attachment for covering the gap between adjoining rear portions of the seat cushions of automobile seats of the type having respective pivoted seat backs adapted to be swung forward.

SUMMARY OF THE INVENTION

In automobiles having spaced front seats with a console there between a gap exists between the seats and the console. Objects are continually dropped into this gap and they are difficult to retrieve particularly when the automobile is in motion with only the driver available to retrieve the object.

It is the object of this invention to provide a flexible, compressible wedge formed from cardboard, plastic or similar fibrous material that can be wedged into the gap to close the top surface.

The wedge constructed from cardboard is made with two vertical side members with the top closed by an accordion pleated section. The pleated top permits adjusting the width of the wedge near the top inside surface to accommodate various spacings between the seat and the console. The wedge is maintained in the expanded configuration by strips of compressible elastomer material The compressible elastomer material is supplied in a plurality of spaced blocks having adhesive surfaces covered with a peel-off protective sheet on each end near the top of the inside surface, to permit tailoring the wedge width to a particular automobile.

DETAILED OF THE PREFERRED EMBODIMENTS

Figures 1, 2, 4, 5:
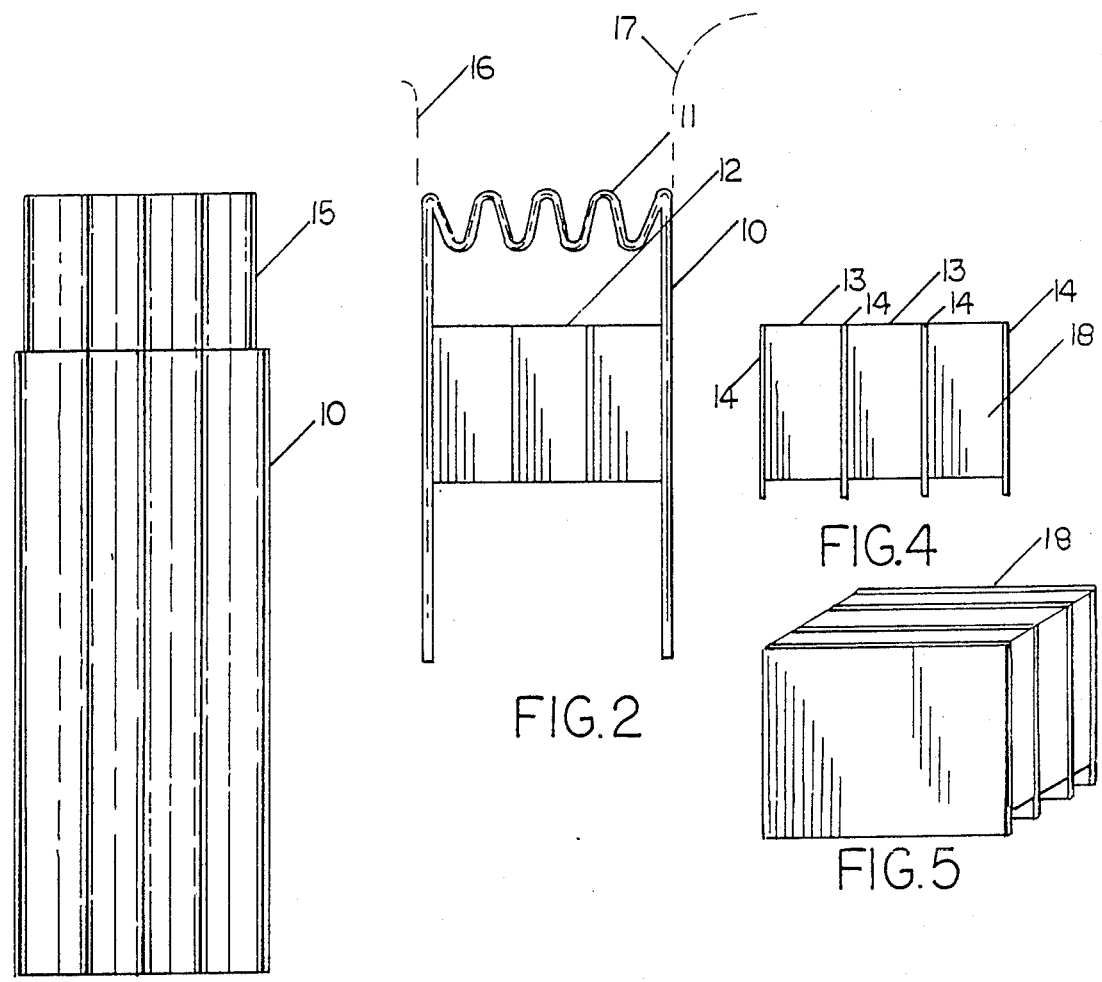
FIG. 1 is a top plan view of the gap closure
FIG. 2 is an end view thereof.
FIG. 4 is a side view of the elastomer package.
FIG. 5 is a top front perspective view of the elastomer package.

FIG. 1 is a top view of the telescoping wedge sections 10 and 15. The telescoping section provide means for matching the overall length of the wedge to the space available.

FIG. 2 is an end view of the wedge 10 with the accordion pleated top section 11, the elastomer section 12 expanding the sides of the wedge 10. The wedge is shown placed between the console 16 and the seat 17. The void between the wedge sides is reserved for seat fasteners or other conveniences.

Figure 3:
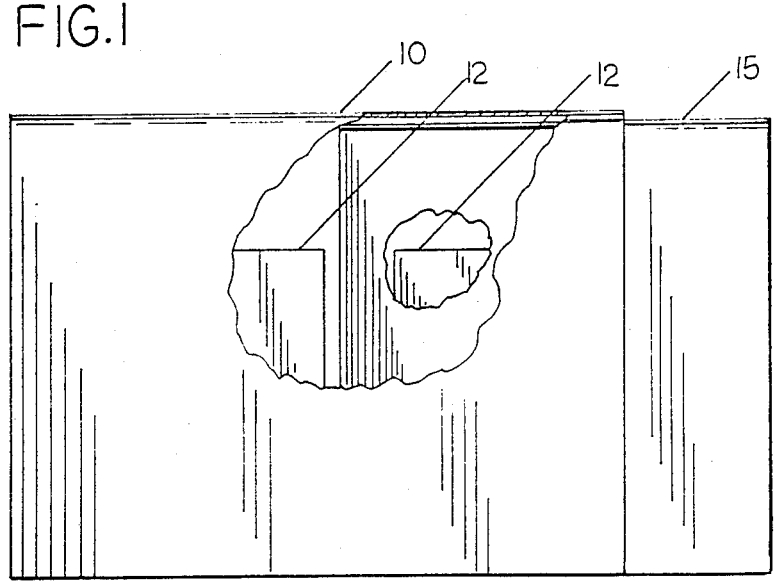
FIG. 3 is a partially sectioned side elevation thereof.

FIG. 3 is a side partially sectioned side elevation of the wedge showing the telescoping 10 and 15 and the movable elastomer section 12;.

FIG. 4 a side view of a package of elastomer blocks 18 with adhesive coated package 13 protected by removable sheets 14.

FIG. 5 is a top front perspective view of a package of removable elastomer blocks 18.

In operation the wedge section 10 and 15 are telescopically adjusted to the selected length by entering wedge 15 into wedge 10 by moving selected assemblies of elastomer sections 12 to clear the end of wedge 15. The selected spacing between the walls of wedges 10 and 15 by adhesively assembling the elastomer sections 13 by removing the protective sheets 14.

I claim:

1. A gap closer for the space between the front seats of an automobile and the console wherein the improvement comprises:
   (a), two spaced flat vertical cardboard or plastic closed at the top by a horizontal accordion pleated portion forming a first wedge;
   (b) a second wedge longitudinally slidable within the first wedge said second wedge formed by two spaced flat vertical cardboard or plastic members closed at the top by a horizontal accordion pleated portion;
   (c), the inside spacing between the vertical walls of said wedges being adjustable due to the horizontal accordion pleated portions, which is determined by adhesively joined blocks of a compressible elastomer material inserted between said vertical members;
   (d), the individual blocks of elastomer material covered on each end with an adhesive coating that is protected during shipping by a peel-off layer of non-adhesive material;
   (e), the first and second wedges joined longitudinally to provide a structure of a desired total length to fit a specific installation.

* * * * *